United States Patent [19]

Tsunehiro

[11] Patent Number: 5,675,396
[45] Date of Patent: Oct. 7, 1997

[54] LIQUID CRYSTAL DISPLAY UNIT HAVING GROUNDING FRAME

[75] Inventor: Naoshi Tsunehiro, Tokyo, Japan

[73] Assignee: Matsushita Electric Industrial Co., Ltd., Osaka, Japan

[21] Appl. No.: 234,380

[22] Filed: Apr. 28, 1994

[30] Foreign Application Priority Data

Nov. 30, 1993 [JP] Japan ................... 5-299779

[51] Int. Cl.[6] .................................. G02F 1/1333
[52] U.S. Cl. ................................. 349/59; 349/149
[58] Field of Search ............... 359/83, 88; 361/753, 361/681, 816, 212, 220; 439/88, 95; 174/35 R, 51, 250; 349/58, 59, 149, 150, 151

[56] References Cited

U.S. PATENT DOCUMENTS

| | | | |
|---|---|---|---|
| 5,333,073 | 7/1994 | Suzuki | 359/83 |
| 5,432,626 | 7/1995 | Sasuga et al. | 359/83 |

FOREIGN PATENT DOCUMENTS

| | | | |
|---|---|---|---|
| 63-68817 | 3/1988 | Japan | 359/83 |
| 1-84220 | 3/1989 | Japan | 359/83 |
| 5-165047 | 6/1993 | Japan | 359/83 |
| 5-257129 | 10/1993 | Japan | 359/83 |
| 5-257130 | 10/1993 | Japan | 359/83 |

*Primary Examiner*—William L. Sikes
*Assistant Examiner*—Tai V. Duong

[57] ABSTRACT

In order to surely prevent display disappearance due to static electricity, a liquid crystal display unit according to the invention includes a structure that at least a part of a glass shielding portion on the periphery of a liquid crystal panel is surrounded by an earthing frame, and the earthing frame is connected to an earth point of a printed circuit board.

7 Claims, 10 Drawing Sheets

LIQUID CRYSTAL DISPLAY UNIT HAVING GROUNDING FRAME

BACKGROUND OF THE INVENTION

1. Industrial Field of the Invention

The present invention relates to a liquid crystal display unit for use in a portable telephone or a compact pocket transceiver, which employs a preventive measure for preventing display disappearance due to electrostatic induction or application of static electricity of the unit.

2. Description of Related Art

Conventionally, as a preventive measure for preventing this kind of display disappearance of a liquid crystal display unit, as shown in FIG. 11, each resistance R of about 1 kΩ is connected to one of signal lines with respect to an LCD controller 1 for electrically controlling a liquid crystal panel in order to prevent an influence due to static electricity (electric fluctuation).

However, the above-described preventive measure for preventing the display disappearance in the conventional liquid crystal display unit has a problem that it is of no effect with respect to an influence of static electricity resulting from the physical structure of the liquid crystal display unit such as electrostatic induction from a glass shielding portion of the liquid crystal panel.

SUMMARY OF THE INVENTION

In order to solve the problems of the prior art, an object of the invention is to provide a liquid crystal display unit in which display disappearance due to static electricity can surely be prevented.

To achieve the above object, in the liquid crystal display unit of the invention, a glass shielding portion on the periphery of a liquid crystal panel is surrounded by an earthing frame, and the earthing frame is connected to an earth of the unit.

According to the invention, because the glass shielding portion of the liquid crystal panel is surrounded by the earthing frame connected to the earth of the unit, the liquid crystal panel is protected from the electrostatic induction through the glass shielding portion and accordingly, it is possible to surely prevent the display disappearance due to the static electricity of the liquid crystal display unit.

DETAILED DESCRIPTION OF THE PREFERRED EMBODIMENTS

Figure 1:
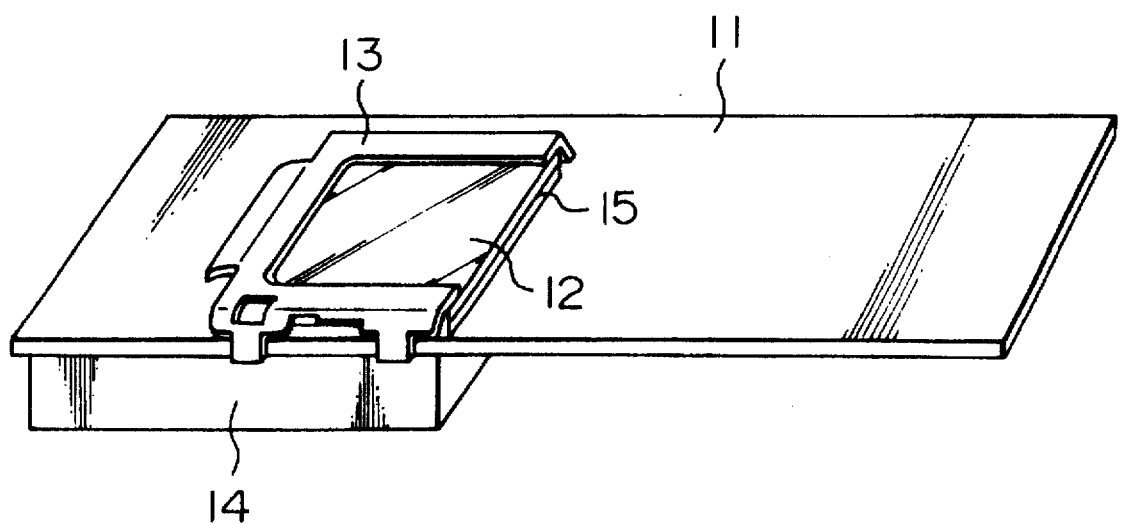
FIG. 1 is a schematically perspective view of a liquid crystal display unit according to a first embodiment of the present invention, wherein a rectangular liquid crystal panel of which three sides are surrounded by an earthing frame is detachably attached on a printed circuit board by means of holding tongues of the earthing frame.

FIG. 1 shows a liquid crystal display unit according to a first embodiment of the invention. Referring to FIG. 1, reference numeral 11 denotes a printed circuit board. A liquid crystal panel 12 is attached on the printed circuit board 11, and a metallic earthing frame 13 is mounted on the liquid crystal panel 12. A shield casing 14 is attached under the printed circuit board 11.

Figure 2:
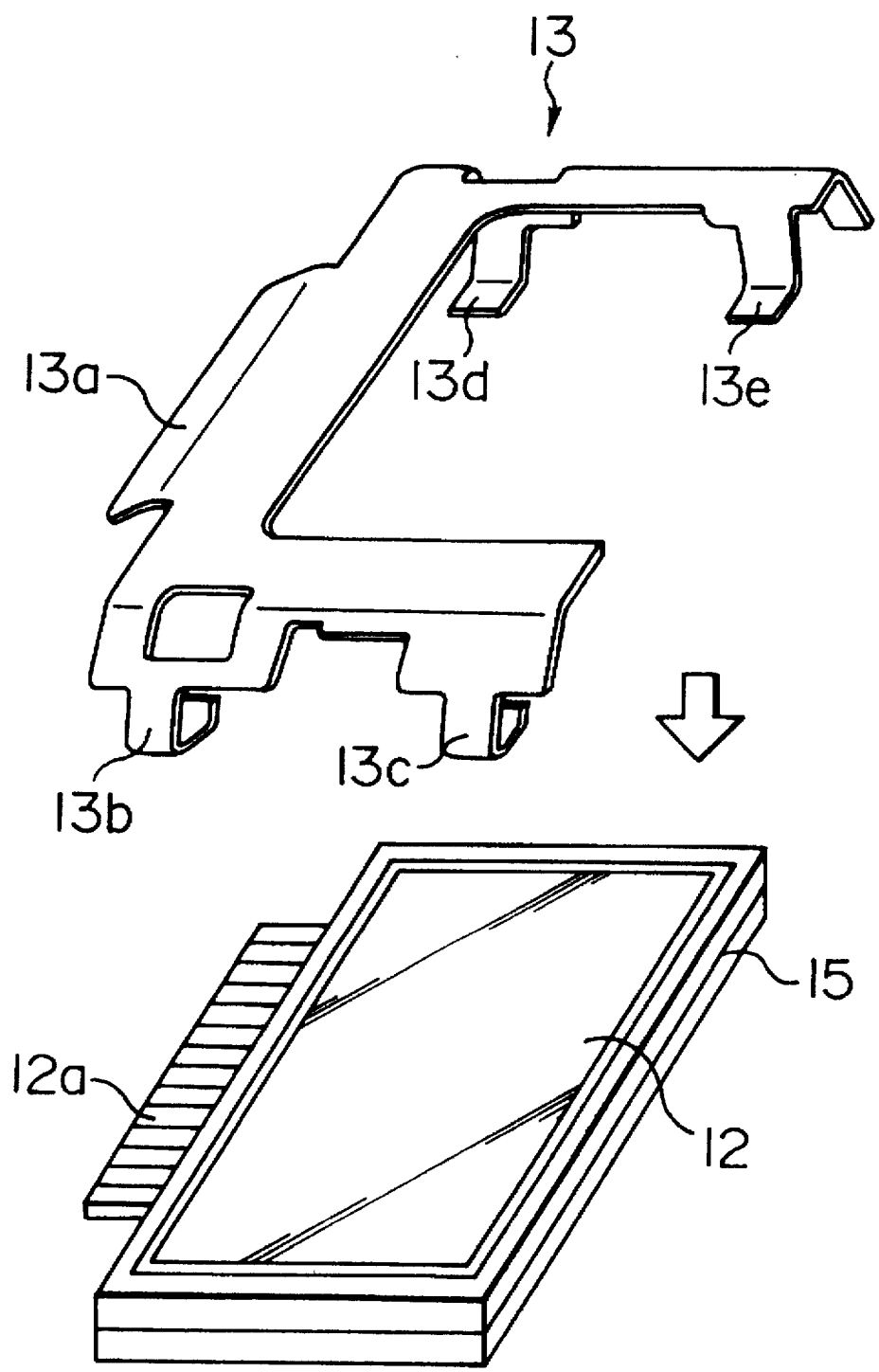
FIG. 2 is a perspective view of the liquid crystal panel and the earthing frame in the first embodiment of FIG. 1, showing a state of them before assembling.

The earthing frame 13 is, as shown in FIG. 2, formed in a substantially U-shape having three sections to extend around the periphery of the liquid crystal panel 11. The earthing frame 13 includes a flange 13a which is formed on an intermediate section and holding tongues 13b, 13c, 13d and 13e which are formed on both sections neighboring to the intermediate section. The holding tongues are extended from the earthing frame downwardly whose ends are bent inwardly, respectively. The flange 13a serves to overlap a TAB tape (Tape Automated Bonding tape) 12a which is a connecting wiring terminal or an operating signal conductor for the liquid crystal panel 12. The respective holding tongues 13b to 13e serve to detachably attach the earthing frame 13 to the liquid crystal panel 12 and to connect the earthing frame 13 to an earth of the liquid crystal display unit. The earth of the unit means, for example, an earth of a main body of a portable telephone, an earth of the printed circuit board or an earth of a casing for the display unit.

The above-constructed earthing frame 13 is laid over the liquid crystal panel 12 on the printed circuit board 11, and is connected to the earth of the printed circuit board 11 by means of the holding tongues 13b to 13e. Since the outer peripheral sides of a glass shielding portion 15 of the liquid crystal panel 12 are, except for one side, covered with the earthing frame 13, the liquid crystal panel 12 is protected from electrostatic induction through the glass shielding portion 15. It is thus possible to surely prevent display disappearance due to such static electricity.

In this embodiment, a spring nickel silver material having a thickness of 0.1 mm was used for the earthing frame 13. The result of the test according to a newly set standard based on IEC/CISPR (International Electrotechnical Commission/ Comité international spécial des perturbations radioelectriques), was that the display disappearance was able to be prevented with respect to the contact discharge of more than 6 kV under the conditions of energy storage capacity of 150 pF and discharge resistance of 330Ω.

Figure 3:
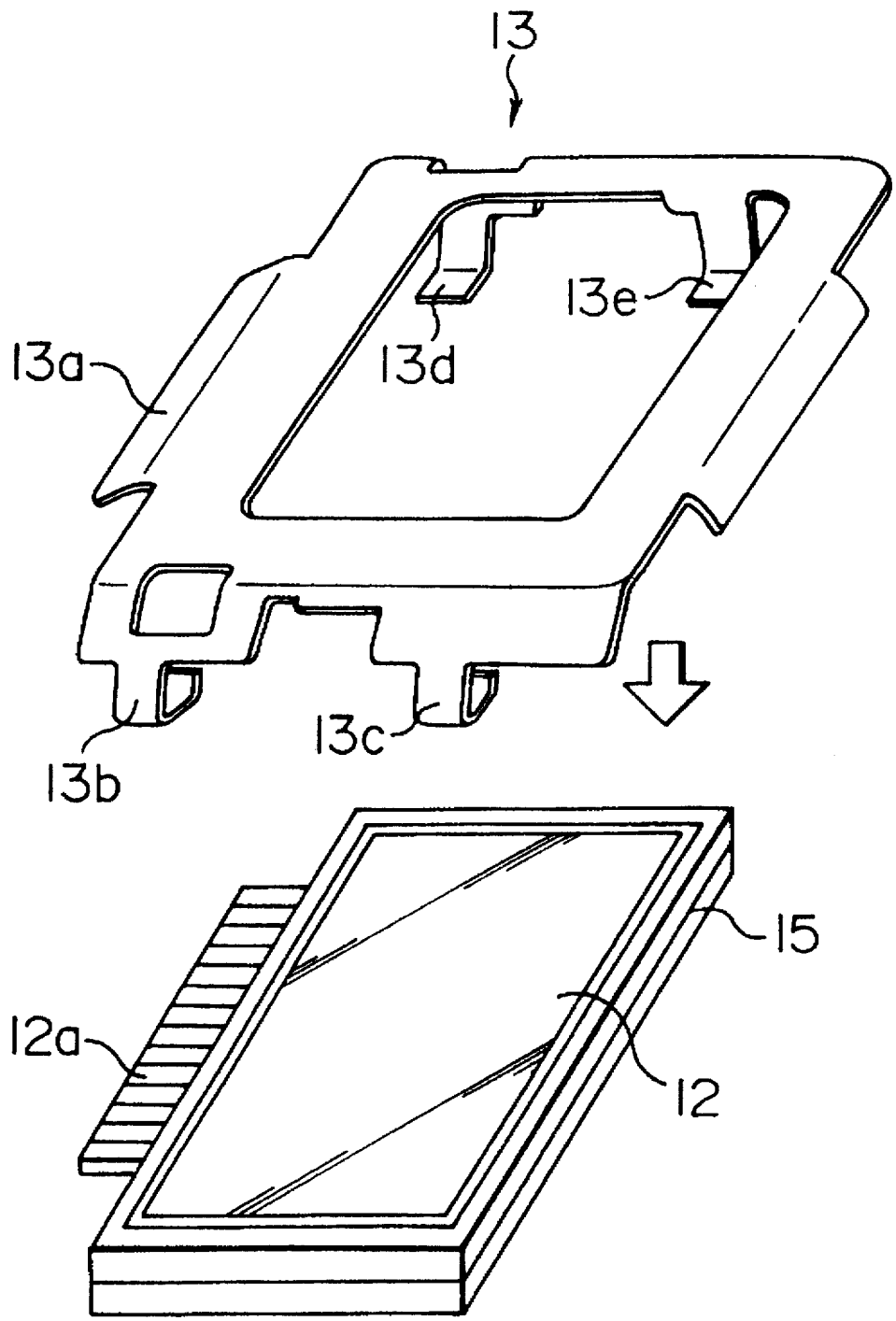
FIG. 3 is a perspective view of a rectangular liquid crystal panel and an earthing frame in a modified example of the first embodiment of FIG. 1, showing a state of them before assembling, wherein the earthing frame surrounds all four sides of the liquid crystal panel.

The above-described embodiment employs the earthing frame extending along the three sides of the liquid crystal panel. Alternatively, as illustrated in FIG. 3, an earthing frame surrounding all four sides of the square liquid crystal panel may be utilized.

Figure 4:
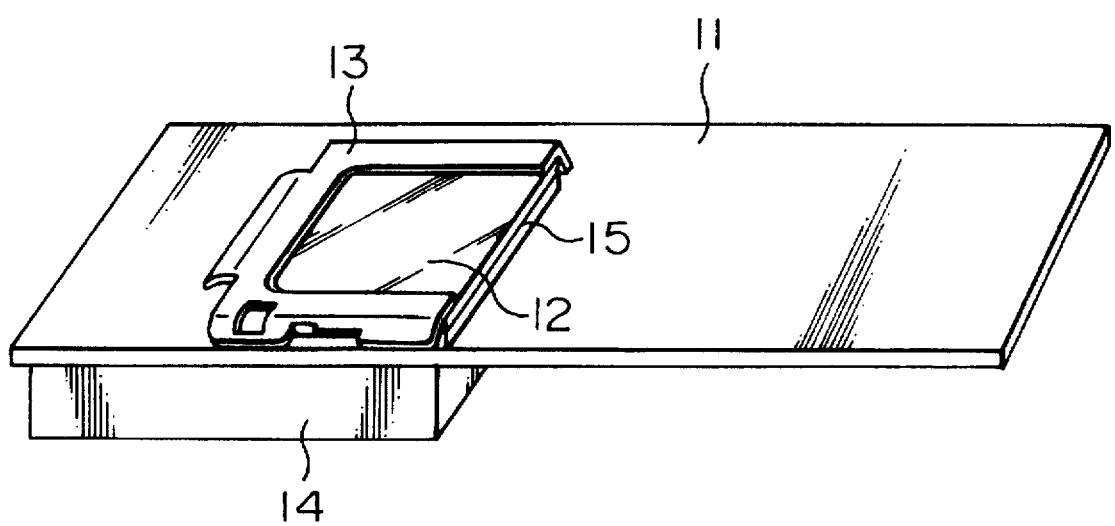
FIG. 4 is a schematically perspective view of a liquid crystal display unit according to a second embodiment of the invention, wherein a rectangular liquid crystal panel of which three sides are surrounded by an earthing frame so as to be integral with the earthing frame is attached and fixed on a printed circuit board by an adhesive.
Figure 5:
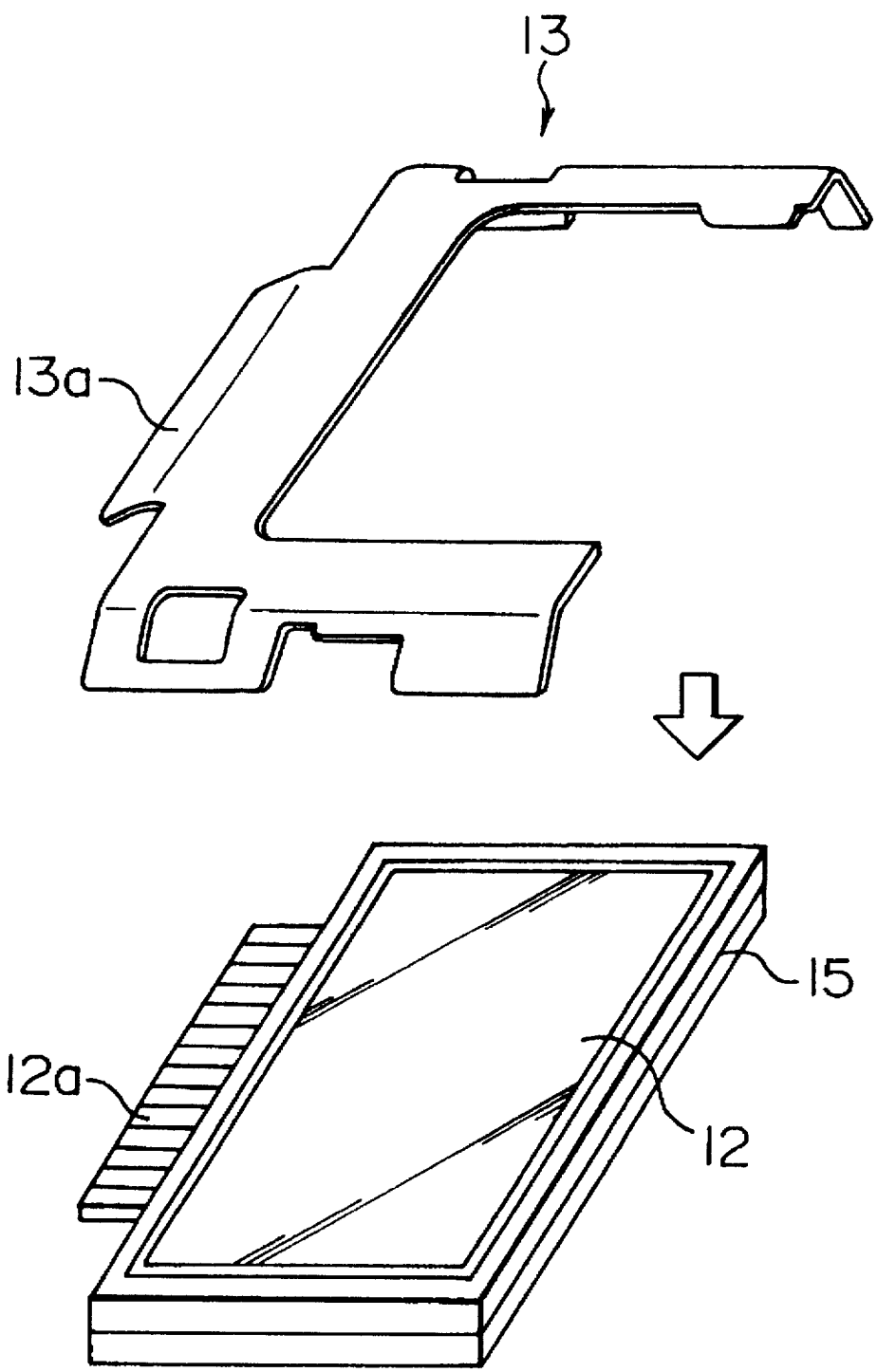
FIG. 5 is a perspective view of the liquid crystal panel and the earthing frame in the second embodiment of FIG. 4, showing a state of them before assembling.
Figure 6:
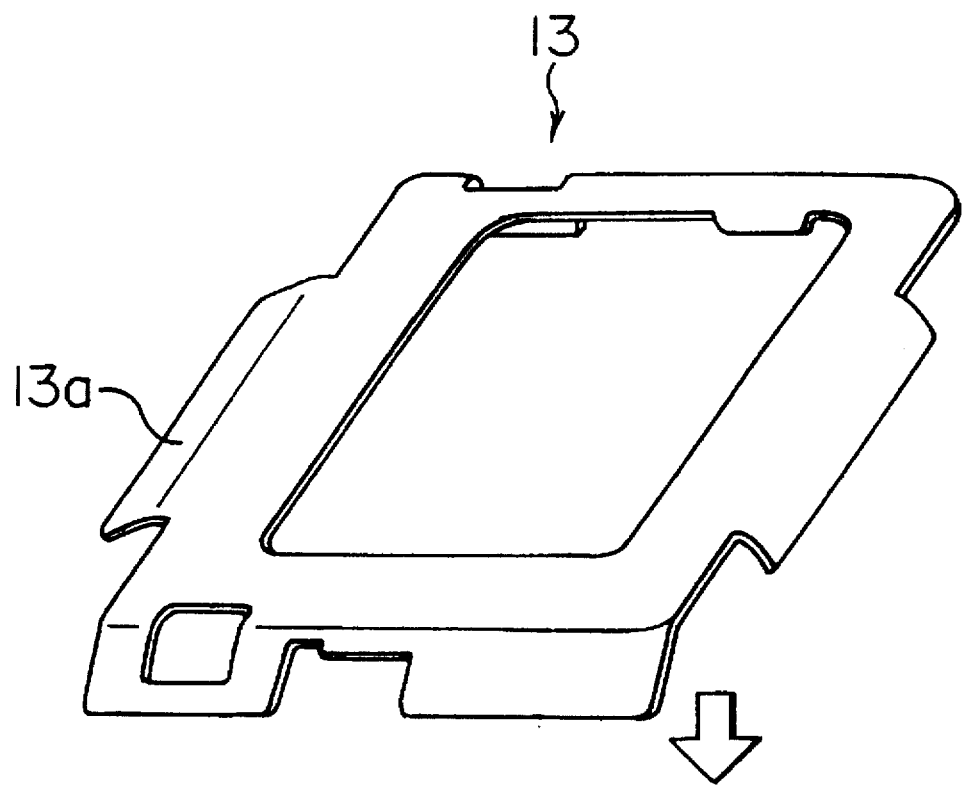
FIG. 6 is a perspective view of a rectangular liquid crystal panel and an earthing frame in a modified example of the second embodiment of FIG. 4, showing a state of them before assembling, wherein the earthing frame surrounds all four sides of the liquid crystal panel.
Figure 6:
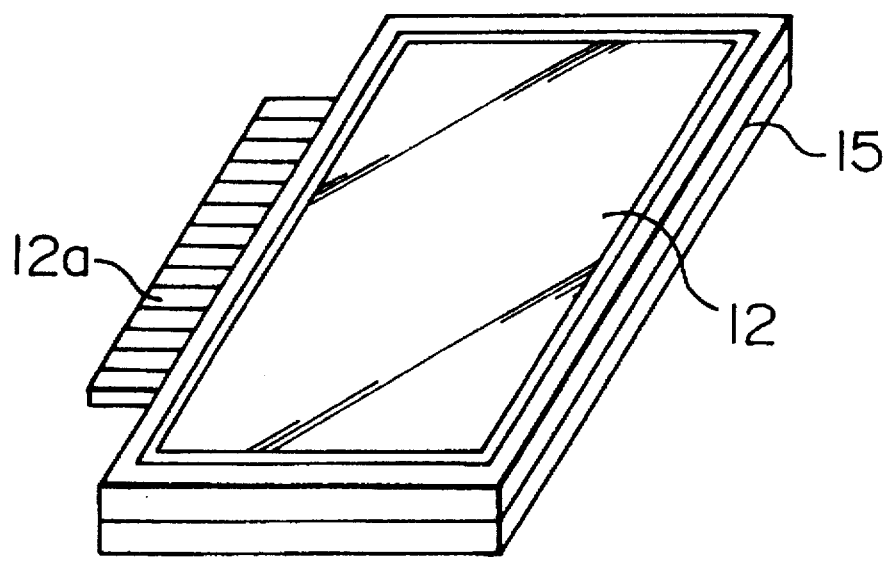
Figure 7:
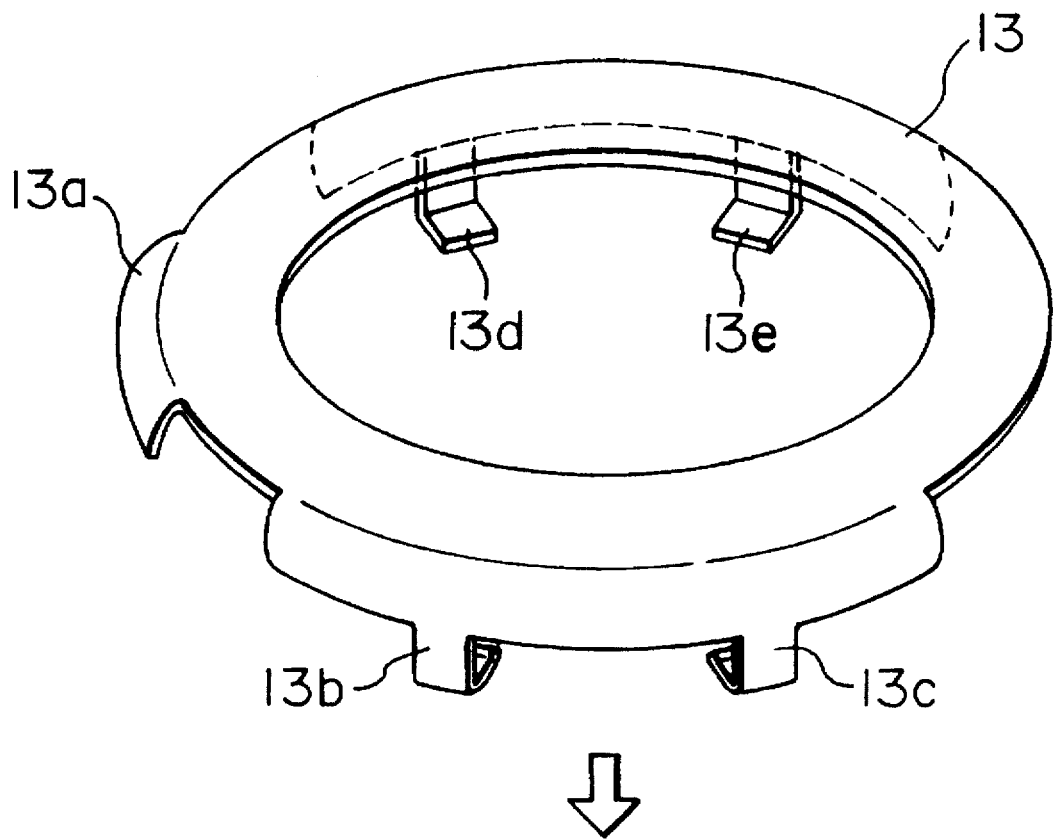
FIG. 7 is a perspective view of a circular liquid crystal panel and an earthing frame in a liquid crystal display unit according to a third embodiment of the invention, showing a state of them before assembling, wherein the earthing frame surrounds the whole periphery of the panel and is detachably attached on a printed circuit board by means of holding tongues of the earthing frame, similarly to the embodiment of FIG. 1.
Figure 7:
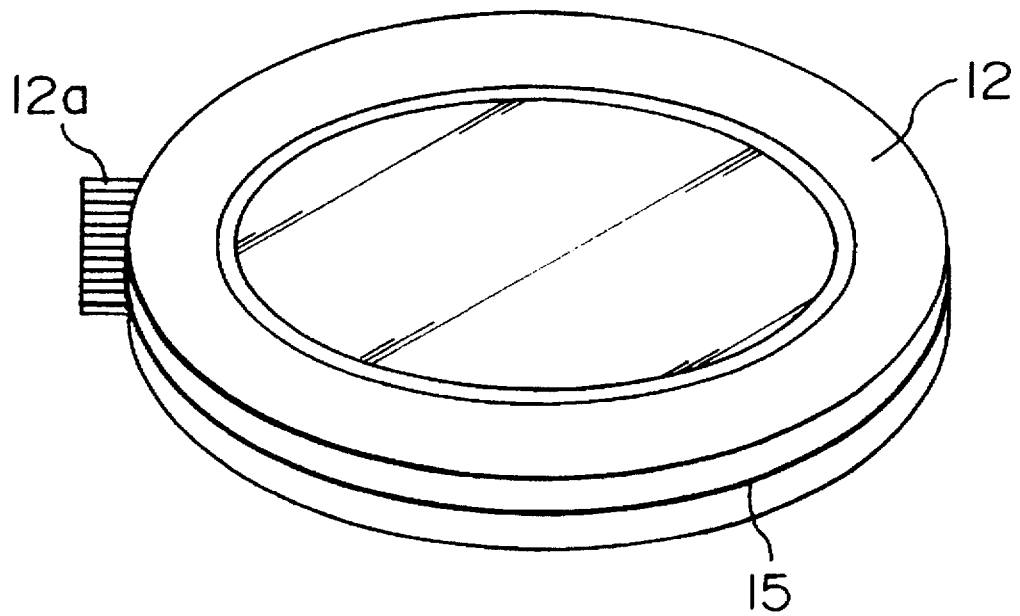
Figure 8:
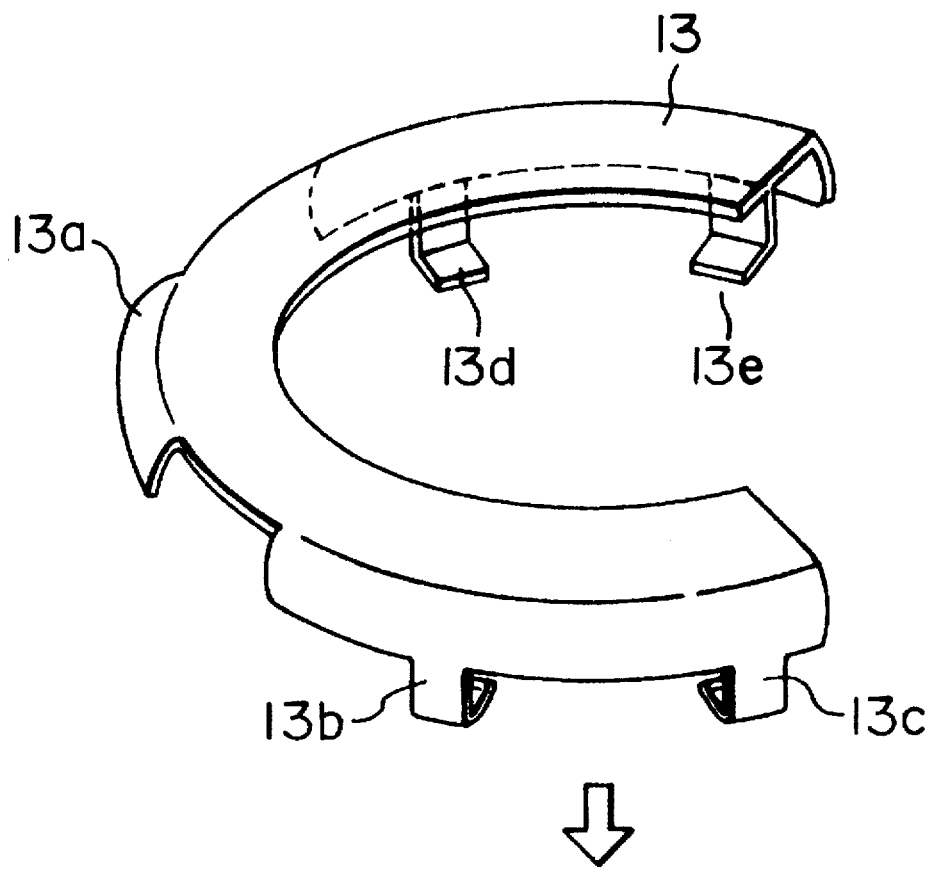
FIG. 8 is a perspective view of a circular liquid crystal panel and an earthing frame in a modified example of the third embodiment according to the invention, wherein the earthing frame surrounds substantially ⅔ of the whole periphery of the liquid crystal panel.
Figure 8:
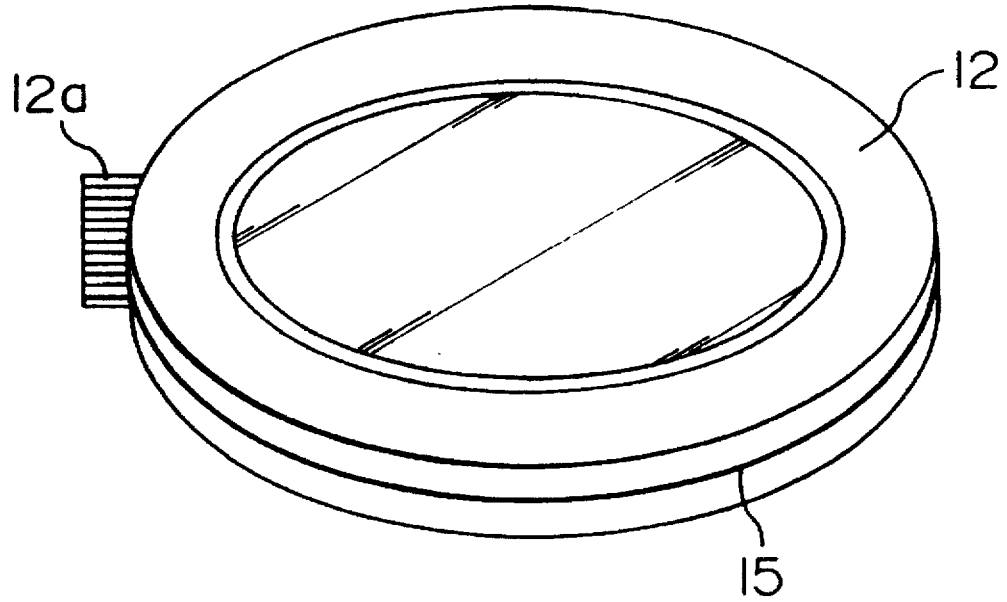
Figure 9:
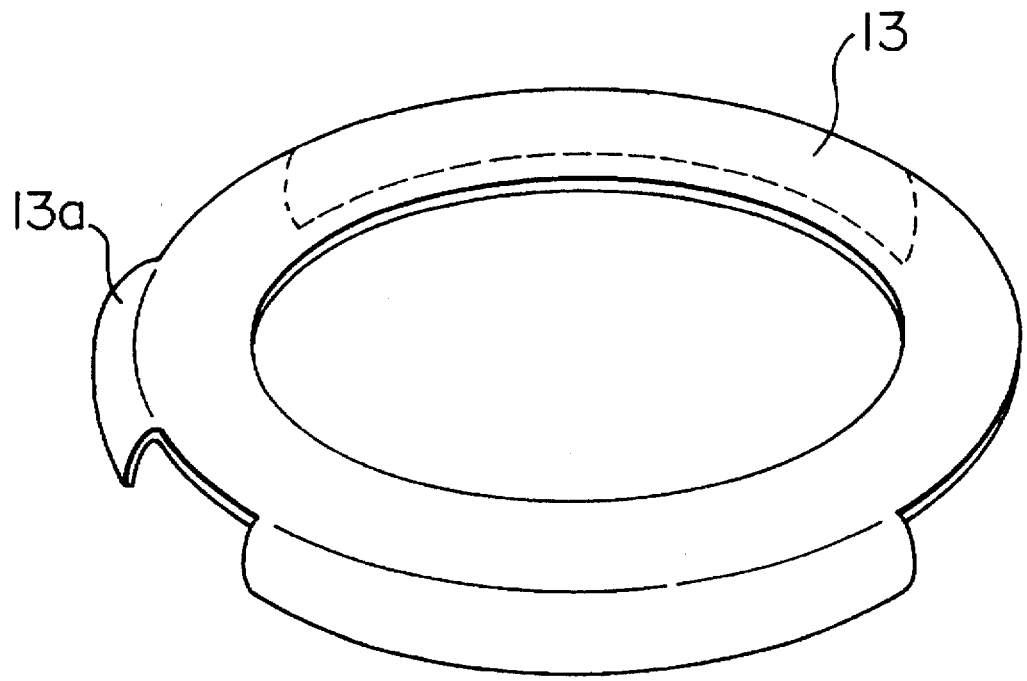
FIG. 9 is a perspective view of a circular liquid crystal panel and an earthing frame in a liquid crystal display unit according to a fourth embodiment of the invention, showing a state of them before assembling, wherein the earthing frame surrounds the whole periphery of the liquid crystal panel so as to be integral with the panel, and it is secured on a printed circuit board by an adhesive, similarly to the embodiment of FIG. 4.
Figure 9:
Figure 9:
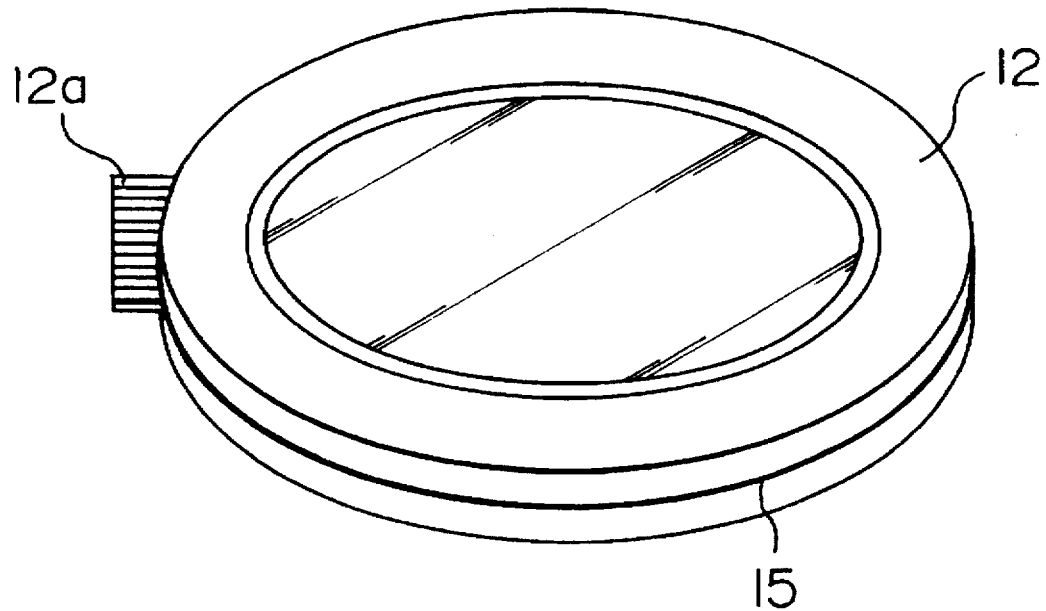
Figure 10:
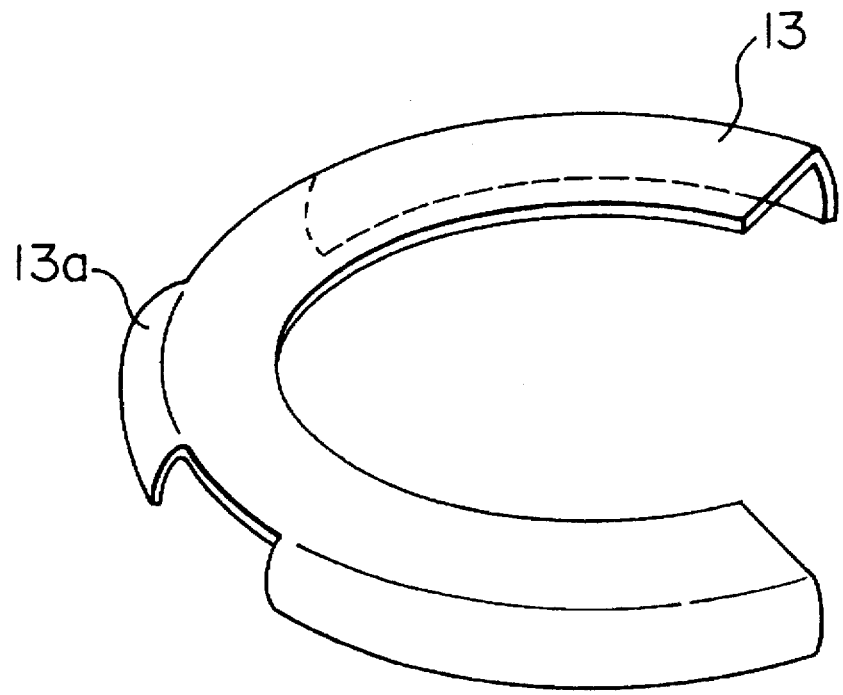
FIG. 10 is a perspective view of a circular liquid crystal panel and an earthing frame in a modified example of the fourth embodiment according to the invention, showing a state of them before assembling, wherein the earthing frame surrounds substantially ⅔ of the whole periphery of the liquid crystal panel, and is secured on a printed circuit board by an adhesive, similarly to the embodiment of FIG. 4.
Figure 10:
Figure 10:
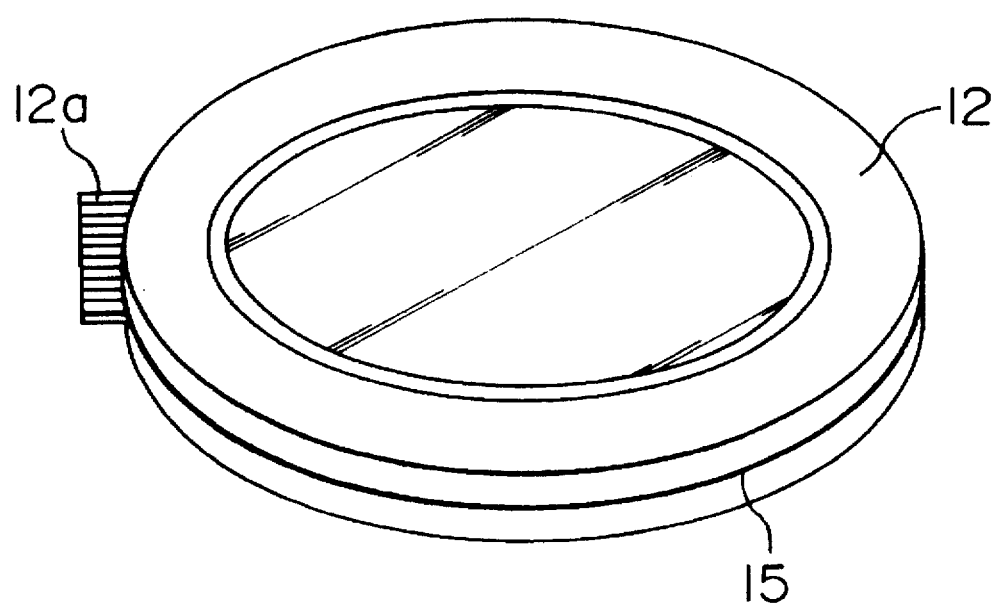
Figure 11:
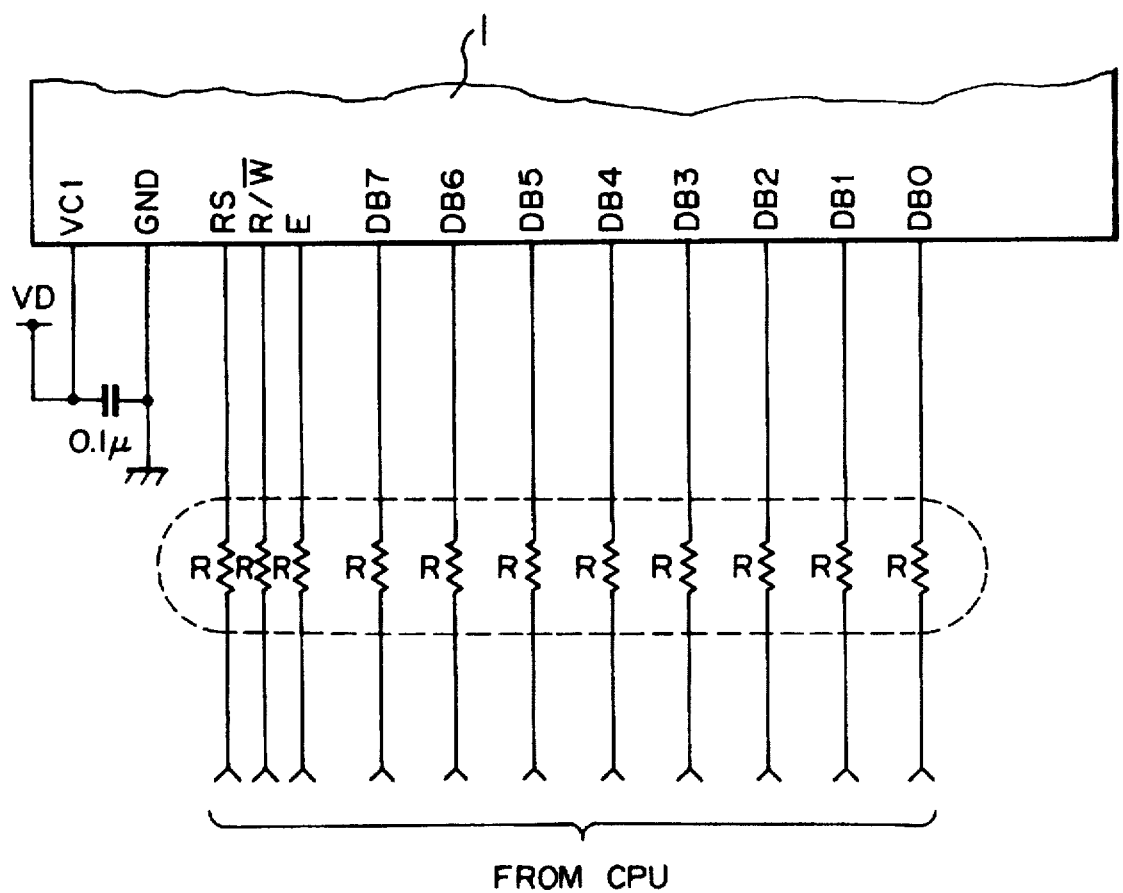
FIG. 11 is a circuit diagram showing a conventional preventive measure for preventing display disappearance due to static electricity.

In the first embodiment and the modified example, the earthing frame 13 employs the holding tongues 13b to 13e in order to detachably connect the earthing frame to the liquid crystal panel in view of the assembling facility. However, it is not always required to detachably attach the earthing frame to the liquid crystal panel. As shown in a second embodiment of the invention and its modified example of FIGS. 4 to 6, an earthing frame 13 may surround a liquid crystal panel 12 so as to be integral with the panel 12, and it may be securely fixed to a printed circuit board by an adhesive or the like, prior to being connected to an earth of the printed circuit board, for grounding. As in the second embodiment, the earthing frame may be fixedly connected to the printed circuit board.

In each of the above embodiments, the liquid crystal panel is formed in a rectangular shape. However, in the liquid crystal display unit according to the invention, as shown in the third and, fourth embodiments and their modified examples in FIGS. 7 to 10, a circular liquid crystal panel is attached on a printed circuit board so as to fulfill functions and effects similarly to the rectangular one of the first or second embodiment Further, in the case where the liquid crystal panel has an oval or polygonal shape, an earthing frame having a configuration corresponding to the shape of the liquid crystal panel can be used so that functions and effects similar to the above-described embodiments are obtained.

As clearly understood from the description of the embodiments, because the glass shielding portion of the liquid crystal panel is surrounded by the earthing frame and the earthing frame is connected to the earth of the liquid crystal display unit, the glass shielding portion of the liquid crystal panel is surrounded by the earthing frame connected to the earth. As a result, the liquid crystal panel is protected from the electrostatic induction or the like through the glass shielding portion. Therefore, it is possible to securely prevent the display disappearance of the liquid crystal display unit due to the static electricity.

What is claimed is:

1. A liquid crystal display unit comprising:
    a liquid crystal panel of rectangular shape, the liquid crystal panel having a shielding portion and a connecting wire terminal;
    a printed circuit board to which the liquid crystal panel is attached, the printed circuit board having an earthing point; and
    an earthing frame which surrounds at least part of the shielding portion on a periphery of the liquid crystal panel, the earthing frame being connected to the earthing point of the printed circuit board so as to prevent disappearance of a display on the liquid crystal display unit due to static electricity, wherein said earthing frame includes (i) a first side with a flange formed thereon and (ii) second and third sides neighboring the first side, at least one holding tongue formed on each of the second and third sides neighboring the first side, the at least one holding tongue formed on said each of the second and third sides extending downwardly from the earthing frame and being bent inwardly, said flange overlapping the connecting wire terminal of said liquid crystal panel, said earthing frame being overlaid on said liquid crystal panel, and said liquid crystal panel being detachably connected to said printed circuit board by means of the at least one holding tongue of said each of the second and third sides.

2. A liquid crystal display unit comprising:
    liquid crystal panel of rectangular shape, the liquid crystal panel having a glass shielding portion and a connecting wire terminal;
    a printed circuit board to which the liquid crystal panel is attached, the printed circuit board having an earthing point; and
    an earthing frame which surrounds at least part of the glass shielding portion on a periphery of the liquid crystal panel, the earthing frame being connected to the earthing point of the printed circuit board so as to prevent disappearance of a display on the liquid crystal display unit due to static electricity, wherein said earthing frame includes (i) a first side with a flange formed thereon and (ii) second and third sides neighboring the first side, at least one holding tongue formed on each of the second and third sides neighboring the first side, the at least one holding tongue formed on said each of the second and third sides extending downwardly from the earthing frame and being bent inwardly, said flange overlapping the connecting wire terminal of said liquid crystal panel, said earthing frame being overlaid on said liquid crystal panel, and said liquid crystal panel being detachably connected to said printed circuit board by means of the at least one holding tongue of said each of the second and third sides.

3. A liquid crystal display unit according to claim 2, wherein said earthing frame includes a pair of said holding tongues formed on each of the second and third sides neighboring to the first side of the earthing frame.

4. A liquid crystal display unit according to claim 2, wherein said earthing frame surrounds all four sides of said liquid crystal panel.

5. A liquid crystal display unit according to claim 2, wherein said earthing frame surrounds three sides of said liquid crystal panel.

6. A liquid crystal display unit according to claim 4, wherein said earthing frame is made of metal.

7. A liquid crystal display unit according to claim 5, wherein said earthing frame is made of metal.

* * * * *